United States Patent [19]

Ladin

[11] 3,937,535
[45] Feb. 10, 1976

[54] BEARING WHEEL ASSEMBLY

[75] Inventor: Eli M. Ladin, Ann Arbor, Mich.

[73] Assignee: Federal-Mogul Corporation, Southfield, Mich.

[22] Filed: Nov. 5, 1973

[21] Appl. No.: 412,712

[52] U.S. Cl. .............................. 308/191; 308/111
[51] Int. Cl.² .................................. F16C 13/02
[58] Field of Search ........... 308/191, 190, 215, 111, 308/112, 210; 301/111, 112, 122

[56] References Cited
UNITED STATES PATENTS

| | | | |
|---|---|---|---|
| 1,035,421 | 8/1912 | Coppins | 308/191 |
| 1,243,929 | 10/1917 | Frauham | 308/191 |
| 1,754,892 | 4/1930 | Hughes | 308/191 |
| 3,157,442 | 11/1964 | Gaubatz | 308/191 |
| 3,594,051 | 7/1971 | Wells | 308/191 |
| 3,807,817 | 4/1974 | Black | 309/190 |

Primary Examiner—Robert R. Song
Assistant Examiner—Richard A. Bertsch
Attorney, Agent, or Firm—Robert F. Hess

[57] ABSTRACT

A wheel bearing assembly is disclosed. The assembly includes component parts which are randomly assembled, supported by a housing member and mounted on a vehicle axle. The assembly includes a pair of race members providing an inner and outer raceway, a cage providing a multiplicity of pockets and individual ball bearing elements received in the pockets.

7 Claims, 6 Drawing Figures

BEARING WHEEL ASSEMBLY

FIELD OF INVENTION

The present invention relates to an improved bearing assembly. The assembly is particularly adapted for mounting a hub on a vehicle axle.

BACKGROUND OF THE INVENTION

Bearing assemblies of one form or another are used in the mounting of wheels on the axle of vehicles which are either self-powered or pulled, such as trailers of the mobile home variety. Bearing assemblies adapted for use in both of these environments heretofore have been found to be high precision items of manufacture and consequently of relatively high cost. This has been found to be the case even though the bearing assembly is required to function only over a relatively short distance of travel from a site of manufacture to final home site. Such limited use is not such a warrant incorporation of a high precision unit in wheel mounting.

BRIEF DESCRIPTION OF THE INVENTION

The present invention provides a low cost bearing assembly of the angular contact bearing type. The bearing assembly is self-contained, as well as non-separable under ordinary circumstances. The component parts may be randomly assembled. That is to say during assembly no concern is paid to match mating the several component parts.

The bearing assembly aside from forming a relatively low cost item, permits a more economical wheel mounting which takes advantage of the lack of a need for many of the more expensive design features of conventional bearings such as large amounts of high alloy steel, close machining tolerances, precision matching of component parts or "match mating" as it is referred to in the art, seal and grease packing around the shaft or axle within the vicinity of the inner bearing assembly, and the like. In this latter regard, the assembly housing, in cooperation with the shaft or axle acts as a labyrinth shield or seal.

In view of the above it is a first aspect of the present invention to provide a low cost bearing assembly designed to withstand the rigors of operation under load over a short distance of several thousand miles as opposed to conventional bearings which are designed to carry similar loads for many thousands of miles. The present invention is particularly designed for use with factory built mobile homes which in normal circumstances are transported from factory to home site over the relatively short distance of several hundred miles. According to this aspect the assembly includes a plurality of components which may be unmatched and randomly assembled. These components are retained by a housing. The assembly includes a pair of race members having raceways that are concave in the facing direction. A cage having a plurality of pockets is positioned between the race members. The cage provides a plurality of pockets for receipt and predetermined spacing of individual balls. The cage, including the pockets are sized in conventional manner such that the balls project outwardly of the pockets to provide a surface for contacting with the raceways. A housing having a cylindrical portion is press fitted on a lip of the outer race member. An inward flange of the housing forming a bore which is smaller than the outer diameter of the inner race member prevents the component parts from falling apart.

As a further aspect of the present invention the housing flange, in cooperation with the shaft or axle, provides a labyrinth shield or seal. In this connection, the inner diameter of the flange is such to provide only a small clearance between the bore and the shaft.

As a further aspect the present invention provides a new mounting for the outer bearing assembly. In this connection, the hub and shaft, providing more than a mere receptacle for the bearing assembly, cooperate with a nut and comprise essential bearing components. The balls and shaft, hub and nut are coordinated so that the angle of contact between the balls and the raceway surface is adjustable, by varying the geometrical relationship of the parts as in conventional design practice, between angles of 5° and a maximum of 55° representing the practical limits for aligning maximum radial and thrust load carrying capacity, respectively.

There has thus been outlined rather broadly the more important features of the present invention in order that the detailed description thereof that follows may be better understood and in order that the present contribution to the art may be better appreciated. There are, of course, additional features of the present invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

For a fuller understanding of the present invention, reference may be had to the following description taken in connection with the accompanying drawings, in which.

DESCRIPTION OF THE PREFERRED EMBODIMENT

Figure 1:
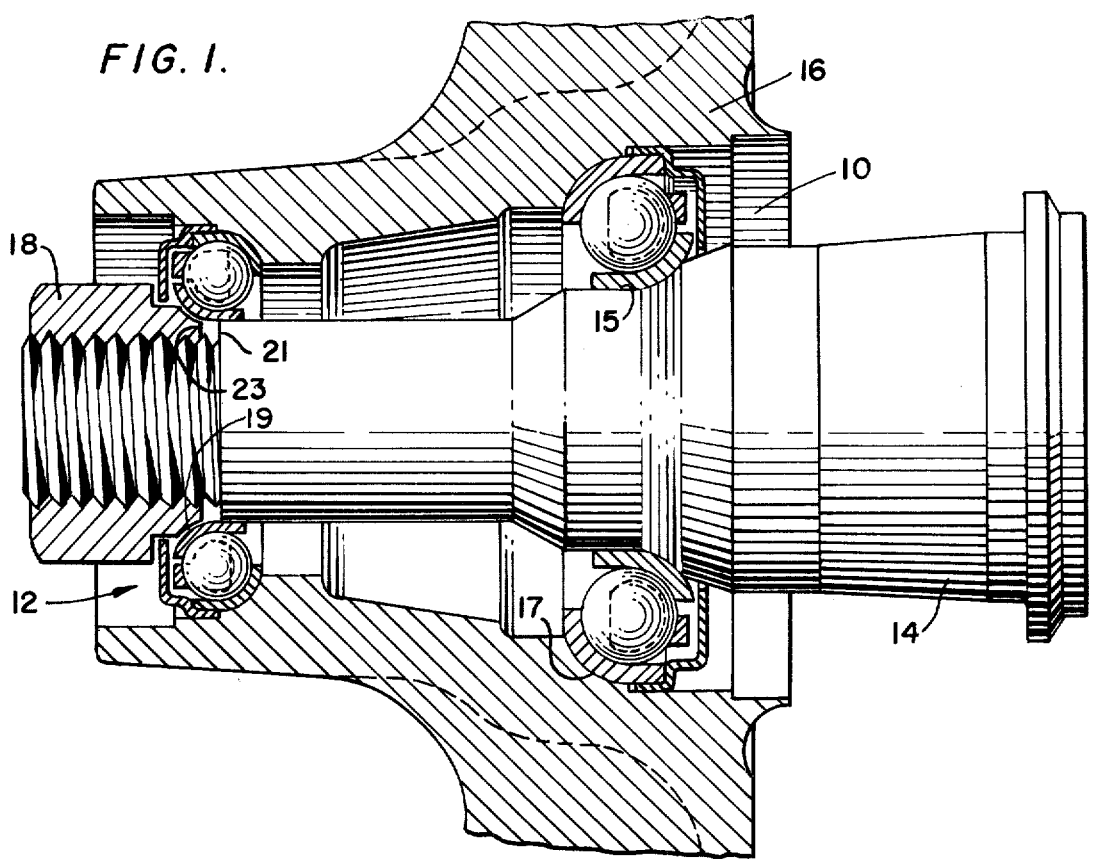
FIG. 1 is an elevational view, partially in cross-section, illustrating the bearing assembly of the present invention in mounted disposition on a shaft to support a hub.
Figure 2:
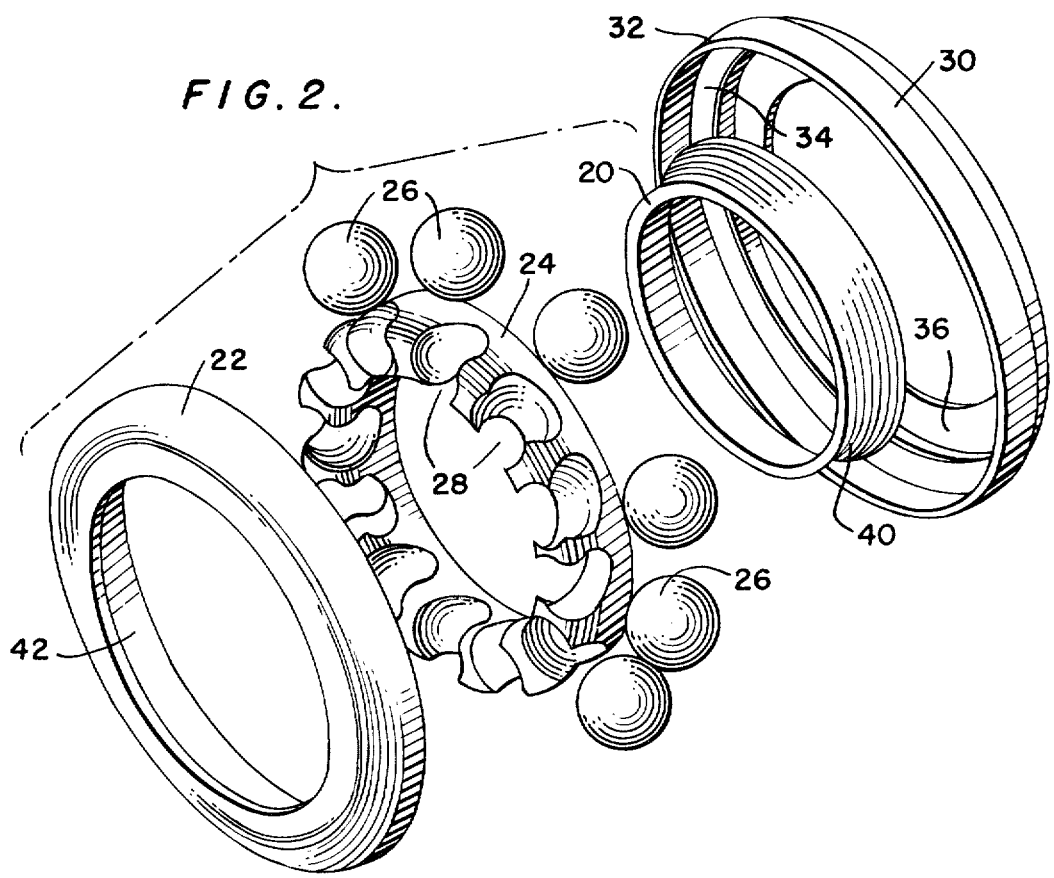
FIG. 2 is an exploded perspective view of the bearing assembly.
Figure 3:
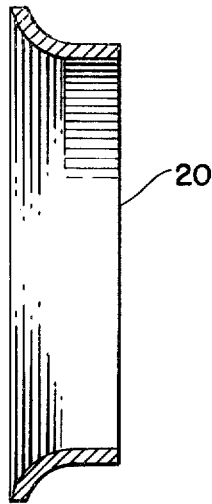
FIG. 3 is a view in cross-section of the inner race member.
Figure 4:
FIG. 4 is a view in cross-section of the outer race member.
Figure 5:
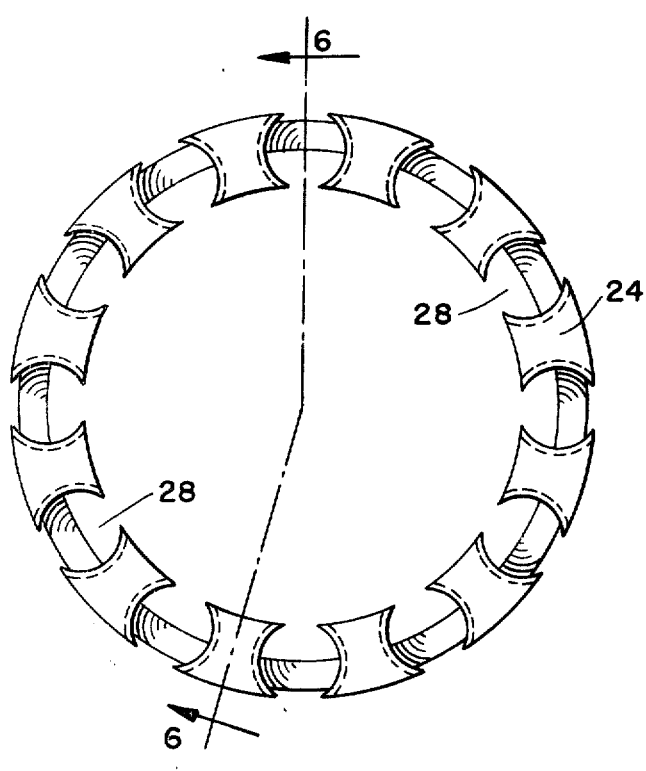
FIG. 5 is a top plan view of the cage member.
Figure 6:
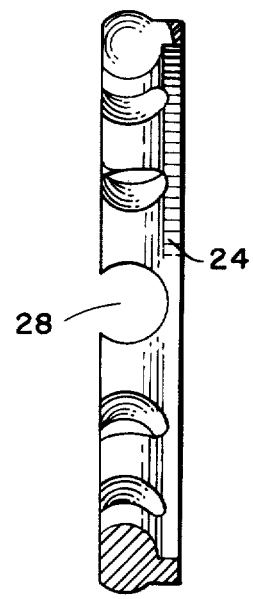
FIG. 6 is a view in cross-section as seen along the line 6—6 in FIG. 5.

FIG. 1 illustrates an operational environment of the present invention in bearing assemblies. The bearing assembly will be more particularly described in connection with the illustrations of FIGS. 2–6. In the Figure an inner and outer bearing assembly 10 and 12, respectively, is disposed around a shaft 14 to support a hub 16, for movement.

In mounting the components the inner bearing assembly first is disposed around the shaft 14 and in supporting abutment with the surface 15 of the shaft. The hub 16 is supported for movement on the bearing assembly. The hub also provides a supporting surface 17 against which the outer race member of the bearing assembly resides. Both the surfaces 15 and 17 are designed with radii of curvature in proportion to the diameter of the balls. Furthermore, as explained below, the respective race members are of uniform thickness so that the inner and outer radii of the curvature of each is proportional and concentric to the respective surface 15 or 17 and thus providing the race member with the structural backup necessary to carry the load being transmitted to the race members. These radii of curvature are important in that bearing capacity, rigidity, stress capacity and angle of contact are either directly or indirectly dependent thereon as is commonly known to those of ordinary skill in the art. The outer and smaller bearing 12 next is received on the shaft and within the hub. The hub during this interval of time is bearing on the inner bearing assembly. Finally, a nut 18 is threadedly received on the shaft to secure the outer bearing assembly. As may be appreciated, the nut is provided with a surface 19 which, likewise, has a radius of curvature that is designed in proportion to the diameter of the individual balls. The design of the outer bearing race members is likewise coordinated with the hub in the same manner as stated above respecting the inner bearing assembly so that unlike the ordinary hub/shaft arrangement which functions merely as a receptacle for the bearing assembly, the structure of the hub, shaft and nut in the present invention are utilized as essential bearing components.

The balls and shaft, hub and nut are coordinated to result in an angle of contact between 5° and 55° for high radial and thrust load carrying capacity. In this connection, the nut is a preload mechanism. The preload force is obtained by virtue of the clearance space designed to be maintained between the stepped shoulder 21 at the threaded end of axle shaft 14 and the inner end 23 of nut 18 when the bearing assembly is in its fully assembled condition.

The bearing assembly 10 (and the bearing assembly 12 which is of like construction although of slightly smaller dimension) includes an inner race member 22, a cage 24 disposed therebetween and including a plurality of individual balls 26. The individual balls are received in pockets 28 which are equidistantly spaced around the annulus of the cage 24. This entire bearing subassembly is held in place by housing 30 which retains the components in assembled condition. The housing is formed by a cylindrical portion 32 and a stepped portion forming a shoulder 34. The stepped portion connects the cylindrical portion to an annular flanged portion 36 which projects toward the axis of the bearing assembly. The flange is dimensioned to provide a small clearance between its bore and the surface of shaft 14.

The cylindrical portion 32 is dimensioned to provide a tight fitting engagement when received over the annular lip 38 on the outer race 22. It is preferred that the respective parts be designed such that each outer race member may be press fitted by hand into secured engagement with its respective housing member. The shoulder 34 formed by the stepped portion of the housing determines the full extent of receipt of the housing on the race. To this end, the shoulder will abut against the end surface of the race. The annular flange in cooperation with the shaft acts as a labyrinth shield or seal. To this end, the bearing assembly obviates the need of a special seal and grease packing as is customary with other bearing assemblies of the prior art.

Both the inner and outer race members 20, 22 may be formed of steel, stamped to the configuration as shown in the figures and treated to a Rockwell hardness of from 50 to about 60. Preferably, the hardness will be 55. Housing 30 can also be formed by stamping. Because stamping of the race members is made possible there are no subsequent surface finishing operations required to be performed as would otherwise be conventional practice. The surface finish and quality can be preselected by selective choosing of metal sheet material.

The thickness of the race members is uniform throughout each race member and is preferably in the order of magnitude of 15% to 18 percent of the ball diameter. As a means of comparison, the thickness of a race member for a conventional bearing for carrying loads of the same magnitude as the present invention is designed to support would be a minimum of 25 percent of the ball diameter size. Accordingly, the savings in material alone is a significant factor favoring my invention over the other designs presently in use. In addition, however, because of the substantial thickness of material these conventional race members must be formed by either forgoing or machining, and both such methods of fabrication are more expensive than stamping.

As is apparent from the figures the race members 20 and 22 provide raceways 40 and 42 which are concave toward one another.

Cage 24 may be formed of metal, such as steel, or plastic, such as nylon. Thus, the cage may comprise a molded item or it may be stamped or machined as desired. The cage will display a small degree of resilience for the purposes of receiving the several balls 26 in the pockets 28. It is preferred, of course, that the balls 26 be made of conventional SAE 5010 steel. This degree of resilience also permits some flexure of the assembly due to loading and misalignment without fracture. However, the cage is of necessary rigidity to provide close tolerance in operation. The cage may provide a plurality of, for example, twelve pockets which are equidistantly spaced circumferentially about the annulus.

The bearing assemblies are mounted in the manner described and as illustrated in FIG. 1. Thus, the inner race member of inner bearing assembly 10 abuts against the shaft and inner race member of outer bearing assembly 12 abuts against nut 18 while the outer race members of both bearing assemblies abut against the hub. The shaft and hub both provide arcuate faces to accommodate the race members.

From the foregoing, it will be seen that in accordance with the present invention there is provided a bearing assembly which provides advantages not heretofor obtained and overcomes the disadvantages in certain uses of the prior art high precision assemblies.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, I claim:

1. A bearing assembly comprising,
   an inner race member, an outer race member, and a plurality of balls therebetween,
   said race members each providing a central bore for receipt around a shaft and interior concave raceway surfaces facing one another for supporting in bearing contact the plurality of balls, said race members each being formed of steel of substantially uniform thickness and having a Rockwell "C" hardness of from about 50 to about 60, and providing exterior convex surfaces adapted for supporting said race members in juxtaposition to complementary concave surfaces on a hub, said shaft, and a preload nut mechanism, respectively, the thickness of each race member being in the order of not less than 10 percent nor more than 25 percent of the diameter of said balls, an annular cage element including a plurality of equidistantly spaced pockets, one of each of said plurality of balls being received by each pocket, the dimension of said pockets and said balls being such that opposed surface portions of each ball extend outwardly and inwardly of its retaining pocket, said cage element being received between said race members in order to space said race members by bearing contact of said opposed surfaces of said balls and said raceways, and a housing means received on one of said race members for retaining the race members, cage and balls as a single assembly.

2. The bearing assembly of claim 1 wherein said housing includes a skirt portion and a radially directed annular portion, said annular portion having a bore which is smaller than the bore of the other of said race members.

3. The bearing assembly of claim 1 wherein said cage element is formed of resilient material to accommodate positioning of said balls in said pockets.

4. In combination, inner and outer antifriction bearing assemblies mounted on an elongated shaft for supporting a hub for relative rotation with respect to said shaft, said shaft including a threaded portion at one end and a circumferential concave surface spaced therefrom, said hub having a pair of spaced circumferential concave surfaces, said inner bearing assembly means including an inner race member and an outer race member and interposed ball bearing means therebetween, said inner bearing assembly received on said shaft and supported by intercooperation of an outer surface on said inner race member which is complementary to said shaft concave surface, said hub being received around said shaft and supported by intercooperation of an outer surface on said outer race member which is complementary to one of said hub concave surfaces, an outer bearing assembly means including an inner race member and an outer race member and interposed ball bearing means therebetween, said outer bearing assembly being received on said shaft adjacent said threaded portion, said hub supported by said outer race member of said outer bearing assembly by intercooperation of an outer surface on said outer race member of said outer bearing assembly which is complementary to the other of said hub surfaces, said inner and outer race members of each bearing assembly being formed of steel of substantially uniform thickness and having a Rockwell "C" hardness of from about 50 to about 60, the thickness being in the order of not less than 10 percent nor more than 25 percent of the diameter of said balls, and a nut, said nut being threaded on said shaft to secure said outer bearing assembly.

5. The combination of claim 4 wherein said nut includes a concave surface at its driven end, said nut surface intercooperating with a complementary surface on said inner race member of said outer bearing assembly.

6. The combination of claim 5 wherein the radius of curvature of the several surfaces are coordinated to the result in an angle of contact between said ball bearing means and said inner and outer race members of from about 5° to about 55° for high radial and thrust load carrying capacity.

7. The combination of claim 4 wherein each said bearing assembly means includes a housing, said housing including a skirt portion and a radially directed annular portion, said skirt portion being received on the respective said outer race member, and said annular portion having a bore which provides slight clearance with said shaft defining a seal between bearing assemblies.

* * * * *